Sept. 7, 1943.
P. J. WALSH
2,329,021
ELECTROMAGNETIC SYSTEM
Filed June 24, 1942
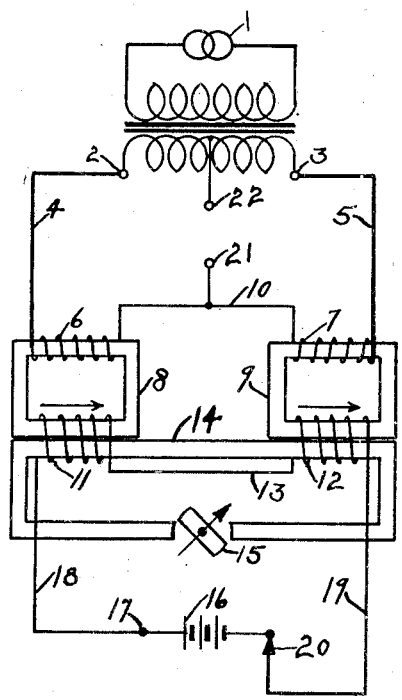
INVENTOR
Philip J. Walsh.

Patented Sept. 7, 1943

2,329,021

UNITED STATES PATENT OFFICE 2,329,021

ELECTROMAGNETIC SYSTEM

Philip John Walsh, San Francisco, Calif.

Application June 24, 1942, Serial No. 448,201

6 Claims. (Cl. 175—363)

This invention relates to a system for magnetizing the core of a transformer or reactor by means of direct and alternating currents simultaneously.

In my Patent No. 2,199,121 I describe a system in which both direct and alternating currents flow through coils wound on the same core of magnetic material, the alternating current being prevented from feeding back into the direct current circuit by means of a large choke coil.

It is an object of this invention to improve the system described in my prior patent.

It is another object of this invention to eliminate the choke coil referred to above, and thus increase the efficiency of the system for low frequency operation.

My invention possesses many other advantages, and has other objects which may be made more easily apparent from a consideration of one embodiment of my invention. For this purpose, I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

The single figure is a schematic wiring diagram of a form of my invention.

I show a source of alternating current 1 connected to the primary of a transformer having the secondary terminals 2 and 3 connected by means of the conductors 4 and 5 to the ends of the coils 6 and 7 wound on the cores of magnetic material 8 and 9 respectively. The direct current coils 11 and 12 are wound around the common iron core 14 as well as around the cores 8 and 9. The magnetic rotor 15 serves as an adjustable air gap in the core 14 and thus provides means to control the reluctance of that path. That is, the rotor is adjusted once to its proper position and then clamped so that it cannot move.

Direct current from the battery 16 flows through the path from terminal 17 over conductor 18, through coil 11, conductor 13, through coil 12, conductor 19 and back to the battery 16 through tap 20. This direct current flowing in the coils 11 and 12 sets up a magnetic flux in the cores in the direction of the arrows. Due to the air gap in the core 14 most of the flux is confined to the cores 8 and 9 which, can be magnetically saturated by proper setting of the tap 20.

As the description proceeds I will explain how alternating current flowing in the coils 6 and 7 causes a change in the strength of the flux in the cores 8 and 9, one core at a time, and how the electromotive force induced in the coils 11 or 12, one coil at a time, is cancelled out, thus maintaining the flow of direct current in the battery circuit substantially constant at all times, and keeping the reactance of the operating coil 6 or 7 as high as possible.

By moving the tap 20 over to terminal 17, the battery 16 is cut out of the circuit and the ends of the coils 11 and 12 are connected together.

Now if alternating current from the source 1 flows through the oppositely wound coils 6 and 7, the electromotive force induced in the coil 11 will be equal and opposite to that induced in the coil 12, and therefore, no induced current will flow through these coils. When the tap 20 is moved along the battery 16, this condition of simple balance no longer obtains and other means must be provided to cancel out the induced electromotive forces.

With tap 20 connected as shown and the cores 8 and 9 magnetically saturated, when alternating current flows through the path from terminal 2, conductor 4, through coil 6 in the direction tending to demagnetize the core 8, conductor 10, through coil 7 in a direction tending to further magnetize the core 9, conductor 5 and back to terminal 3, the magnetic flux through the core 8 has been reduced while substantially no change in the flux occurs through core 9. When the flux strength is reduced in the core 8 there is a shift of the flux from the core 8 to the core 14 as well as a collapse of the flux upon the coil 11. By proper adjustment of the rotor 15 the electromotive force induced in the coil 12 by the flux shifted to the core 14 can be made equal and opposite to the electromotive force induced in the coil 11 by that portion of the flux which collapses on the coil 11. It must be remembered that that portion of the flux which merely shifts from the core 8 to the core 14 does not constitute a flux change through the coil 11 and does not induce an electromotive force in the coil 11. The result of this action is to reduce the flux strength through the coil 11 and simultaneously increase the flux strength through the coil 12. Since these coils are equal, equal and opposite flux changes produce equal and opposite induced voltages which cancel out and thus have no effect on the flow of current from battery 16 through the coils. When the alternating current flowing through the coils 6 and 7 reaches its maximum value, the flux through the core 8 reaches its minimum value, the flux through the core 14 reaches its maximum value and the flux through core 9 remains substantially unchanged. As this half cycle of alternating current gradually falls away to zero value the flux in core 8 builds up to its normal steady value, one half of this build-up comprising the flux shift back from the path through core 14 to core 8. Therefore, the changes in flux strength through the coils 11 and 12 are again equal and opposite and induce equal and opposite electromotive forces in the coils 11 and 12 which, cancel out.

During the other half of the cycle current flows from terminal 3 to terminal 2 through the coils 7 and 6, the current flowing through coil 7 tends to demagnetize the core 9 while that flowing through coil 6 tends to further magnetize the core 8, thus causing a reduction of the flux strength through the core 9 but substantially no change in the flux strength through core 8. Now, as before, part of the flux developed by the coil 12 shifts over from the path through core 9 to the path through core 14 while an equal amount collapses on the coil 12 thus causing equal and opposite electromotive forces to be induced in the coils 11 and 12 which, cancel out. When the current flowing through the coils 6 and 7 reaches its maximum value, the flux through the core 9 reaches its minimum value, the flux through the core 14 reaches its maximum value and the flux through core 8 remains substantially unchanged. As this half cycle gradually falls away to zero value the flux through core 9 builds up to its normal steady value, one half of this build-up comprising the flux shift back from the path through core 14 to the path through core 9. Again, as before, the changes in flux strength through the coils 11 and 12 are equal and opposite and induce equal and opposite electromotive forces in the coils 11 and 12 which, cancel out. Since no induced current can flow in the battery circuit the coils 11 and 12 do not act as a load on the coils 6 and 7.

The cores can be made of ordinary transformer laminated iron, or the cores 8 and 9 can be made of such alloys as Allegheny "A" metal with the core 14 of laminated silicon steel.

Since the operation of the system to produce direct current at the terminals 21 and 22 is described in my prior patent referred to above, further detailing thereof is unessential.

I claim:

1. In a system of the character described, a transformer having primary and secondary coils, another transformer having primary and secondary coils, said primary coils being connected together and to a source of alternating current, and load circuit terminals connected, one to a point between said primary coils and the other to an intermediate point on said source of alternating current, means connecting said secondary coils together and to a source of direct current, and means comprising a core of adjustable reluctance coupling said secondary coils to develop electromotive forces therein which oppose the flow of induced current through said coils.

2. In combination, a coil connected to a source of alternating current potential, another coil connected to a source of direct current potential, means for magnetically coupling said coils through a path of low reluctance, and means cooperating with said first means for balancing out electromotive forces induced in said other coil comprising another coil coupled through a path of high reluctance to said coupling means and connected in said direct current circuit.

3. The system as claimed in claim 2 with the addition of means to adjust the reluctance of the high reluctance path.

4. In combination, a winding for connection to a source of alternating-current potential, a second winding for connection to a source of direct-current potential, means magnetically coupling said windings through a path of low reluctance, and means for balancing out alternating-current voltages induced in said second winding, said last means including a third winding electrically connected to said second winding and magnetically coupled thereto through a path of high reluctance.

5. In combination, a winding for connection to a source of alternating-current potential, a second winding for connection to a source of direct-current potential, means magnetically coupling said windings through a path of low reluctance, and means for balancing out alternating-current voltages induced in said second winding, said last means including a third winding connected in series with said second winding and magnetically coupled thereto through a path of high reluctance.

6. In a system wherein alternating current is supplied to a winding on a saturable core and wherein said core is normally supplied with saturating current flowing through a saturating coil on said core from a source of direct current potential; a second core of greater reluctance than said first core, linking said saturating coil, a second coil mounted on said second core in series with said first coil, said second core and second coil cooperating to induce in said second coil, potentials opposite in phase to those induced in said first coil, and means for adjusting the reluctance of said second core to balance the potentials induced in said series coils to preclude the flow of fluctuating currents therein.

PHILIP JOHN WALSH.